US008533763B2

(12) United States Patent
Royster

(10) Patent No.: US 8,533,763 B2
(45) Date of Patent: Sep. 10, 2013

(54) IN-FLIGHT ENTERTAINMENT SYSTEM

(75) Inventor: Howard Isham Royster, Lafayette, CA (US)

(73) Assignee: Intheairnet, LLC, Irvine, CA (US)

( * ) Notice: Subject to any disclaimer, the term of this patent is extended or adjusted under 35 U.S.C. 154(b) by 0 days.

(21) Appl. No.: 13/414,078

(22) Filed: Mar. 7, 2012

(65) Prior Publication Data

US 2012/0233645 A1  Sep. 13, 2012

Related U.S. Application Data

(60) Provisional application No. 61/449,960, filed on Mar. 7, 2011.

(51) Int. Cl.
*H04N 7/18* (2006.01)
(52) U.S. Cl.
USPC ......................................................... 725/77
(58) Field of Classification Search
None
See application file for complete search history.

(56) References Cited

U.S. PATENT DOCUMENTS

| 4,866,515 | A | 9/1989 | Tagawa et al. | |
|---|---|---|---|---|
| 6,014,381 | A | 1/2000 | Troxel et al. | |
| 6,047,127 | A | 4/2000 | McCarten et al. | |
| 6,058,288 | A | 5/2000 | Reed et al. | |
| 2003/0217363 | A1 | 11/2003 | Brady et al. | |
| 2005/0216938 | A1* | 9/2005 | Brady et al. | 725/76 |
| 2006/0174285 | A1* | 8/2006 | Brady et al. | 725/76 |
| 2007/0130591 | A1* | 6/2007 | Brady et al. | 725/76 |
| 2008/0063398 | A1* | 3/2008 | Cline | 398/66 |
| 2008/0312778 | A1* | 12/2008 | Correa et al. | 701/3 |
| 2009/0007194 | A1* | 1/2009 | Brady et al. | 725/77 |
| 2009/0138920 | A1* | 5/2009 | Anandpura | 725/76 |
| 2010/0162325 | A1* | 6/2010 | Bonar | 725/76 |
| 2010/0162326 | A1* | 6/2010 | Bonar | 725/77 |
| 2010/0162327 | A1* | 6/2010 | Bonar | 725/77 |
| 2011/0047580 | A1* | 2/2011 | Kurita et al. | 725/77 |

* cited by examiner

*Primary Examiner* — Jason J Chung
(74) *Attorney, Agent, or Firm* — McKenna Long & Aldridge LLP

(57) ABSTRACT

An in-flight entertainment system includes a server and a server/client interface. The server/client interface interfaces with the server and a display unit to retrieve a specified data block requested by the display unit, where the server/client interface sends a command to a storage device controller of the server to retrieve the specified data block from a storage device under the control of the server. The server/client interface operating based on its own control logic.

1 Claim, 5 Drawing Sheets

IN-FLIGHT ENTERTAINMENT SYSTEM

CROSS-REFERENCE TO RELATED APPLICATION

This application claims priority benefit of U.S. Provisional Patent Application No. 61/449,960 filed on Mar. 7, 2011, the disclosure of which is incorporated herein by reference in its entirety.

FIELD OF THE DISCLOSURE

This disclosure relates generally to in-flight entertainment system.

BACKGROUND

An in-flight entertainment system provides for audio and video contents to a passenger during flight. The in-flight entertainment system becomes increasing important during long flights where passengers may associate a quality or service of the airline based on the enhanced experience they obtained with the in-flight entertainment system. To accommodate the passengers, airlines resort to providing enhanced features to the in-flight entertainment system. However, known in-flight entertainment systems are usually in-seat computers connected to a back seat display. The in-seat computers are heavy and costly to maintain. Also, because of the enhanced features that the in-seat computers have to run, heat generated by the in-seat computers is a source of problem. Further, each in-seat computer is connected to a central server with long cable lines. This configuration has potential safety and fire hazard issues.

Cost of an in-flight entertainment system is a major issue for the airlines. While passengers demand for enhanced features in an in-flight entertainment system, they are not willing to pay a premium for the services. Thus, in most instances, the enhanced features and the in-flight entertainment system add to the operating costs of the airlines. Furthermore, in-flight entertainment systems may require routine upgrades in order to keep current with the technology.

SUMMARY

An in-flight entertainment system includes a server and a server/client interface. The server/client interface interfaces with the server and a display unit to retrieve a specified data block requested by the display unit, where the server/client interface sends a command to a storage device controller of the server to retrieve the specified data block from a storage device under the control of the server. The server/client interface operating based on its own control logic.

DETAILED DESCRIPTION

Figure 1:
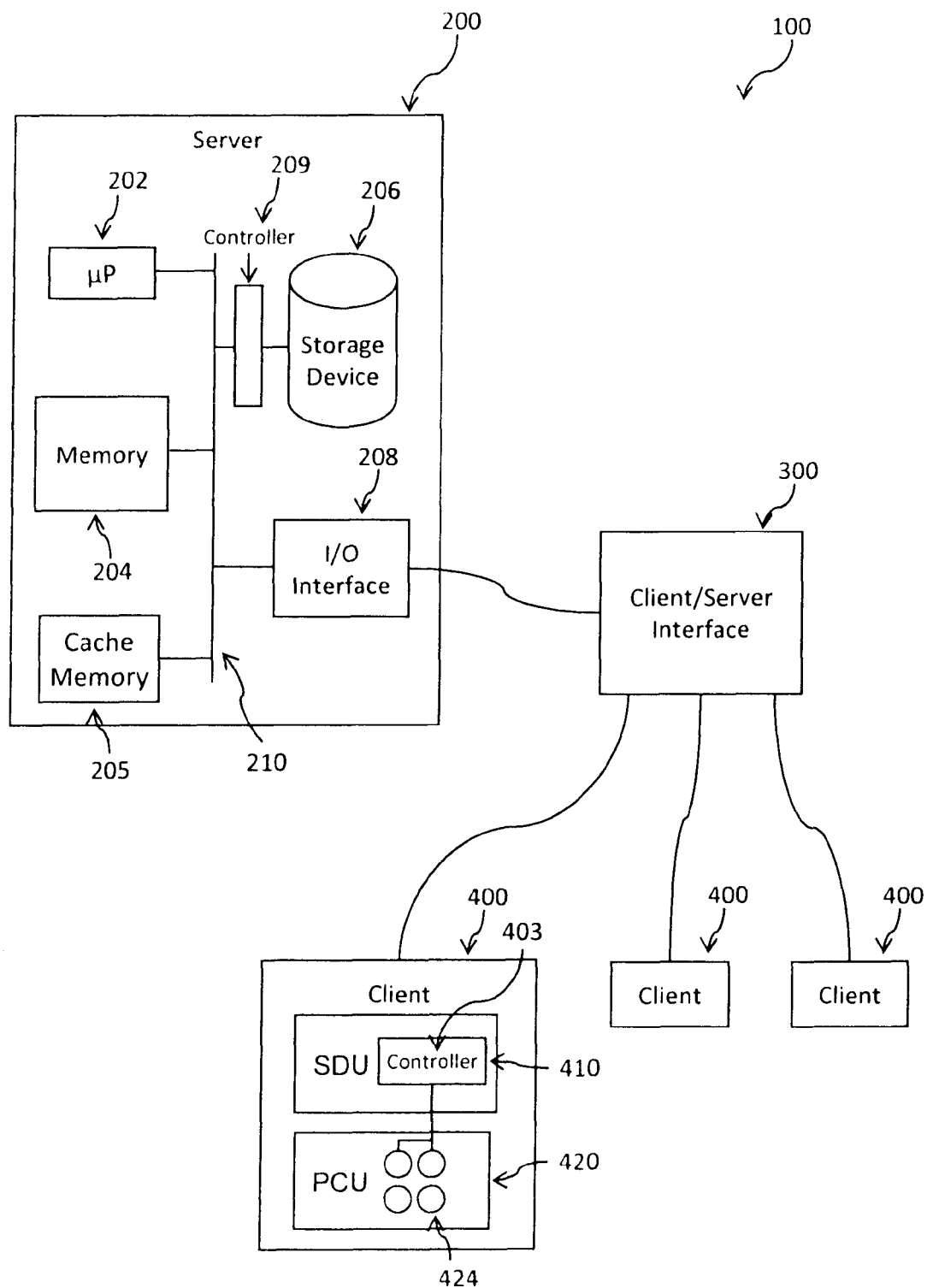
FIG. 1 illustrates an exemplary in-flight entertainment system 100 according to one embodiment.

FIG. 1 illustrates an exemplary in-flight entertainment system 100 according to one embodiment. The in-flight entertainment system 100 comprises a server 200, a server/client interface 300, and one or more clients 400. While the figure shows one server 200, in other embodiments, a plurality of servers may be used. Preferably, the server may be a blade system including one or more blades in a blade enclosure. The one or more blade servers may be commercially available through Hewlett-Packard, IBM, Dell, Cisco, and etc. Usually, the server 200 includes a microprocessor 202 or a plurality of processors that execute a sequence of instructions based on one or more inputs received by the server 200 and usually the server 200 outputs one or more results based on the executed sequence of instructions. The server 200 usually further includes a memory 204, which may be volatile, such as Dynamic Random Access Memories (DRAMs) or Static Random Access Memories (SRAMs), and one or more storage devices 206 such as a hard drive and/or an optical drive all which are coupled together through a bus 210. The server 200 uses the memory 204 to store and execute instructions of an operating system or an application, and/or to store and manipulate data. The storage device 206 is used to store the operating system and applications which the server 200 can retrieve to the memory 204 when needed, and is used to store data which among others pertain to moving maps showing progress of flight, movies, shopping, games, and information of interest to a passenger. In this embodiment, the server 200 is mainly used to store data. The server 200 stores data in a form of command scripts containing command strings, and graphic data sets that may be processed at the client 400 to generate video images at a client display unit. Further details of the command scripts, graphic data sets, and how they are processed at the client 400 will be described further below.

Also coupled to the bus 210 may be one or more input/output (I/O) interfaces 208 from which the server/client interface 300 may communicate with the server 200 and from which the server 200 may communicate with the server/client interface 300. In an alternative embodiment, the server/client interface 300 may be integrated with the server 200 and may operate as one of the server components. While various operating systems, which may be customized or commercially available, may be used, in this embodiment, the server 200 uses Linux operating system. Based on passenger input, the client 400 sends a packet, for example, through an Ethernet link, to the server 200 requesting data required by the passenger. The server 200 receives the packet, determines that the packet should be directed to the server/client interface 300, and forwards the packet to the server/client interface 300. In an alternative embodiment, the client 400 sends the packet through the Ethernet link to the server/client interface 300. The server/client interface 300 parses the packet to determine which data block in the storage device 206 is being requested by the client 400 and sends commands to the storage device controller 209 to retrieve the data block stored in the storage device 206.

In one embodiment, the storage device controller 209 may be a Serial Advanced Technology Attachment (SATA) controller. The storage device controller 209 retrieves the data block and may deliver the data block to a cache memory 205 or to the server/client interface 300 using, for example, burst transfer. The server/client interface 300 receives the data block, packetizes the data block, and forwards the packetized data block to the client 400 using, for example, a 100 Mbit Ethernet link. For example, the Ethernet link may be a pair of twisted wires in each direction that provides 100 Mbit/sec of throughput in each direction in full duplex mode.

To summarize, the role of the client 400 is to receive an input of the passenger, forward the input to the server 200 or the server/client interface 300 depending on the embodiment, receive the data block from the server, and display the data block at the client display unit. The client 400 usually does not execute any applications but rather receives and displays data. Most if not all execution of applications and processing of data are performed at the server 200.

A client 400 may include a seat display unit (SDU) 410 that is disposed at a back of a seat and a passenger control unit (PCU) 420 that is wired or wirelessly connected to the SDU 410. The PCU 420 may include one or more control buttons 424 that the passenger may use to select from a menu that may be displayed on a display of the SDU 410. In an alternative embodiment, the display of the SDU 410 may include a touch screen that may obviate a need for the PCU 420 since the functions of the PCU 420 are integrated into the SDU 410. The SDU 410 may further include a controller 403 that is in communication with the one or more control buttons 424 of the PCU 420, or the touch screen of the SDU 410 depending on the embodiment. The controller 403 may be a field programmable gate array (FPGA). However, the controller 403 need not necessarily be limited to a FPGA and may be an application specific integrated circuit (ASIC), a complex programmable logic device (CPLD) or other suitable integrated circuit devices. In this embodiment, an FPGA available from Xilinx® Inc., located in San Jose, Calif., USA, may be used. As an example, the Virtex-5 series may be used. The one or more inputs from the PCU 420 or the touch screen communicate the passenger's request to the controller 403 of the SDU 410.

In the embodiment where the controller is a FPGA, the FPGA is configured as a finite state machine that transitions to a state in a finite number of states where each transition occurs due to an input from the PCU/touch screen or triggered by an event such as requesting a next data block. Simply put, the finite state machine is driven by events. For instance, an event may be triggered by an input signal from the passenger through the control buttons located at the PCU/touch screen. Events may be triggered when a data block received from the server is nearly exhausted and the next data block is required. A triggering event may be periodic timing signals where each event is triggered each time a signal that represents a time of day is sent by a clock to the finite state machine. Each event causes the finite state machine to transition from a current state to another state, or in some cases, the finite state machine does not transition to another state but returns to the current state. There are many action types in the finite state machine such as "entry action" where an action is performed when entering a state; and "exit action" where an action is performed when exiting a state. Usually, the finite state machine described above performs entry action. However, the finite state machine need not be limited to this type of action.

Figure 2:
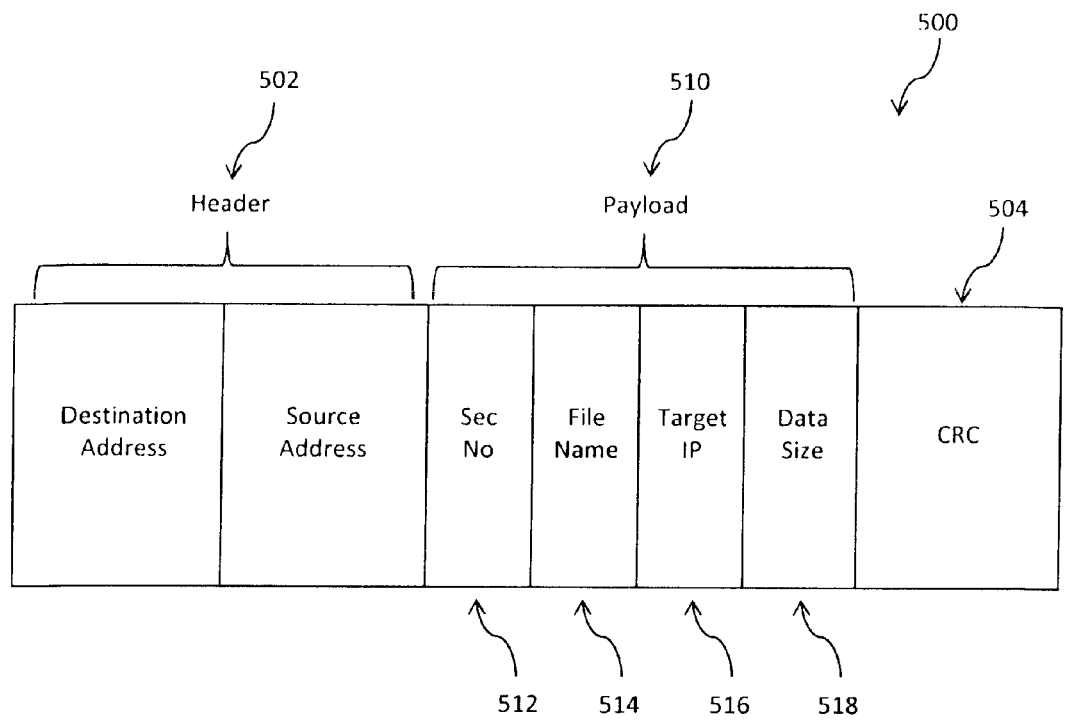
FIG. 2 illustrates an exemplary packet that may be sent by a seat display unit (SDU) to a server according to one embodiment.

The SDU 410 keeps track of data blocks that are being received in a session with the server 200. An operation of the server 200, the server/client interface 300, and the client 400 is now described. The passenger reviews various items that are shown in a menu displayed at SDU 410. When the passenger uses the PCU/touch screen to make a selection on the menu, a packet representing the passenger's selection is sent by the SDU 410 to the server 200. FIG. 2 illustrates an exemplary packet 500 that may be sent by the SDU 410 to the server 200. Along with a header 502 that complies with Ethernet protocol, the packet 500 includes a load 510 that includes a sector number of the storage device 512, file name 514, target Internet Protocol (IP) address 516, and size of data block 518. Also included in the packet 500 may be a cyclic redundancy check (CRC) 504. The packet 500 is received and forwarded by the server 200 to the server/client interface 300. The server/client interface 300 parses the packet 500 to retrieve various information, such as those described above, contained in the payload 510 of the packet 500. Information contained in the packet 500 allows for the server/client interface 300 to identify where the requested data block is located in the storage device 206. For example, the passenger may be requesting for a moving map showing progress of the flight. Once identified, the server/client interface 300 sends commands to the storage device controller 209 to retrieve the requested data block from the storage device 206. A moving map system is usually part of the avionics system of the aircraft from which the server 200 can receive positional information. Using commercially available software, such as those available from ERSI located in Redlands, Calif., USA, the server 200 uses the positional information to update and store data in the storage device 206 pertaining to the position of the plane with respect to a regional or world map in real time.

Figure 3:
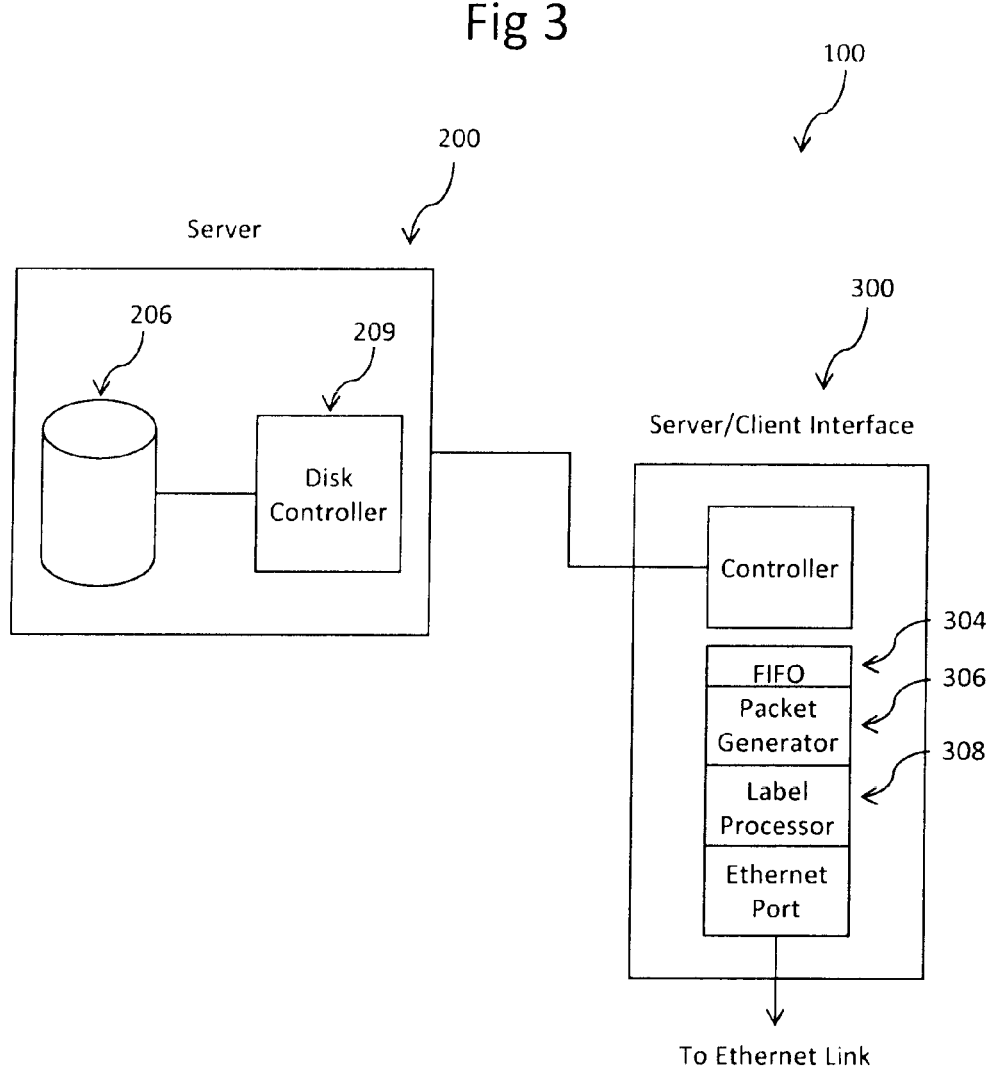
FIG. 3 illustrates a server/client interface including a controller implemented in field programmable gate array (FPGA) that parses a packet received from a SDU according to one embodiment.

Referring now to FIG. 3, the server/client interface 300 may include a controller implemented in FPGA that parses a packet received from the SDU 410 to determine the location of the requested data block in the storage device 206, sends a command to the storage device controller 209 to retrieve the requested data block from the storage device 206, transfers the retrieved data block to a first-in-first-out (FIFO) queue 304, packetizes the data, and sends the packetized data over the Ethernet link to the SDU 410. Prior to further describing the server/client interface 300, a preview of the conventional server system is deemed helpful in understanding the operation of the server/client interface 300.

The conventional server comprises a microprocessor and storage drive, for example, as in the server of the in-flight entertainment system described above. However, the operation of the server is different in that the server lacks the client/server interface. Therefore, the conventional server operates in the following manner: The server is connected to the Ethernet allowing for a conventional SDU, which may be a terminal or a microcomputer, also connected to the Ethernet to communicate with the server. When a passenger requests for a session with the server, the SDU establishes a service connection with the server using an communication protocol, such as Transport Control Protocol/Internet Protocol (TCP/IP). The server is managed by an operating system which may be the linux operating system. The server application parses the request from the SDU and initiates a call to the storage device driver through the operating system interface. The storage device driver sends a command to the storage device drive controller to access the specified data block requested by the SDU. The storage device drive controller retrieves and delivers the requested data block to an operating system memory buffer. The storage device driver then copies the data block from the operating system memory buffer to the server application buffer.

Once the copy is completed, the server application presents the data block in the server application buffer to the network through a local area network (LAN) interface provided by the operating system. The LAN interface is an application program interface (API) to the network stack provided as part of the server operating system. For example, the LAN interface may be the seven layer structure of the Open Systems Interconnection (OSI) model. The OSI model comprises of seven layers, each of which is responsible for a particular function required to transmit the packet to the SDU. Some layers add a header containing parametric data relevant to a corresponding layer at the destination stack of the SDU. Thus, the data block that was retrieved from the storage device is copied one or more times as data travels through the layered structure of the OSI to form the data packet that the network driver can send over an Ethernet port of the server.

An exemplary server/client interface 300 is shown in FIG. 3. The server/client interface 300 provides a hardware interface between the SDU 410 (see FIG. 1) and the server 200 which retrieves specified data block from the storage device 206, packetizes the data block, and forwards the packetized data block to the SDU 410 over the Ethernet link using hardware logic. The server/client interface 300 sidesteps the API, the multiple layers of the OSI, and the operating system interface, and thereby provides for a faster retrieval, packetization, and sending of packets than the operating system model of the conventional server. The server/client interface 300 may include a controller implemented with one or more FPGAs that provide for hardware logic that commands the storage device controller 209 to retrieve the specified data block in the storage device 206, and build one or more Ethernet packets from the retrieved data block to transport the data block to the SDU 410. For example, the FPGA may be a Xilinx® FPGA where the controller is implemented using a soft core microprocessor such as the Microblaze. The Microblaze may execute one or more command scripts that causes the server/client interface to receive the packet from the SDU, extract from the packet parameters relevant to the storage device controller to retrieve the specified data block, and present the parameters to the server/client interface control logic. The Microblaze also retrieves from the packet the target IP that is used to send the data block to the requesting SDU. The target IP is presented to the server/client interface control logic which is used to generate a header for one or more Ethernet packets to transport the retrieved data block The server/client interface 300 includes a first-in-first-out (FIFO) queue 304, a packet generator 306, and a label processor 308. The retrieved data block is received through the FIFO queue 304. The packet generator 306 generates a packet conforming to the Ethernet protocol having a first field that contains the target IP of the SDU 410 to which the packet is being sent; a second field that contains the address of the server/client interface 300 which is sending the packet; and a payload of up to 1500 bits. In this embodiment, the target IP may be the Media Access Code (MAC) address which is uniquely assigned to each SDU 410 in the in-flight entertainment system. Alternatively, the assigned IP address to the SDU 410 may be used. For purposes of explanation, the MAC address will be used here with an understanding that the IP address and the MAC address may be interchangeably used based on design criteria. When the client/server interface 300 is ready to transport the retrieved data block to the SDU 410, because the label processor 308 already knows the MAC address of the SDU 410, the packet generator 306 is able to create the packets-on-the-fly.

In other words, a label processor 308 in concert with the packet generator 306 can create a header of the packet in advance that includes the source and destination address of the packet because the MAC address of the SDU 410 has been previously stored. At the time of transmission, the packet generator 306 with the label processor 308 build the requisite header of the Ethernet packet, and the data block retrieved by the storage device controller is serially sent, usually by burst transfer, to the FIFO queue 304 of the server/client interface 300. The FIFO queue 304, in turn, serially transfers up to 1500 bits of the data block which is concatenated as data payload into the packet while a cyclic redundancy check (CRC) is calculated by the packet generator 306 and concatenated into the packet as the packet is released to the Ethernet port 308, which may travel through layer 2 (i.e., MAC sub layer) of the OSI model. In so doing, the server/client interface 300 sidesteps the software overhead of the operating system, the disk driver and the LAN interface in building the Ethernet packet.

Figure 4:
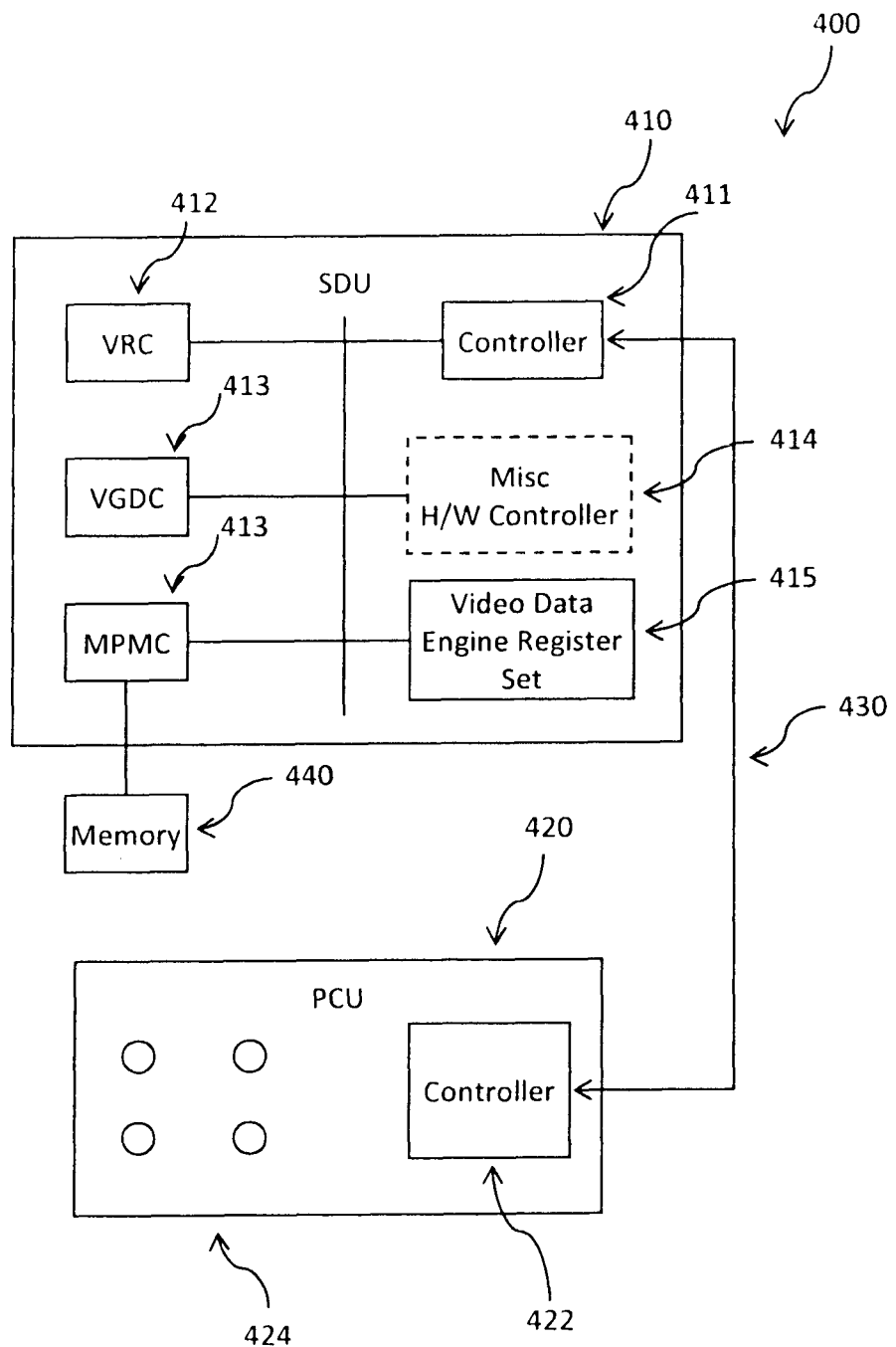
FIG. 4 illustrates a schematic diagram of a client according to one embodiment.

Referring now to FIG. 4, a more detailed schematic diagram of the client 400 is shown. The PDU 420 may include a controller 422 that may be implemented using a soft core processor in a Xilinx FPGA. The controller 422 detects for any inputs received from one or more control buttons 424 of the PDU 420. When the controller 422 detects a selection from the passenger the controller 422 may convert the input into a command code which may be ASCII strings that specifies a service requested by the passenger. The command code is sent to the SDU 410 wirelessly or through a serial or parallel link. The SDU 410 includes a second controller 411 which is part of a video data engine. The second controller 411 receives and processes the commands strings, and communicates with the client/server interface 300 to initiate a session that causes the SDU 410 to perform the specified video operations requested by the passenger.

In one embodiment, the second controller 411 may be the Microblaze which is a 32-bit reduced instruction set computer (RISC) soft core processor having the following features:

Thirty-two 32-bit general purpose registers
32-bit instruction word with three operands and two addressing modes
32-bit address bus
Single issue pipeline The second controller 411 may use Big-Endian bit-reversed format to represent data. Bit-reversed means that bit 0 is the most significant bit and bit 31 is the least significant bit. Big-Endian means that byte 0 is the most significant byte and byte 3 is the least significant byte of the bytes comprising a 32-bit word. In one embodiment, the first controller 422 in the PCU 420 and the second controller 411 in the SDU 410 may communicate over a pair of Fast Simplex Links (FSL) busses 430. The FSL 430 implements a unidirectional point to point first in first out (FIFO)-based communication link between the two controllers.

The Microblaze in the FPGA in conjunction with the other components in the FPGA form the video data engine. The video data engine is a multi-purpose, multi-function, scalable engine that may be customized using commands and graphic data sets that provide for the character of the in-flight entertainment system. That is, the commands and the graphic data sets may be custom tailored to meet the specific requirements of an application. Further details of customizing the in-flight entertainment system will be described further below.

According to one embodiment, the video data engine implemented in a Xilinx FPGA may include the following components:

Xilinx MicroBlaze;
Xilinx Multi-Port Memory Controller (MPMC);
Video Raster Controller (VRC);
Video Graphics DMA Controller (VGDC);
Miscellaneous Hardware Controllers;
Video Data Engine Register Set (VDERS); and
Static or Dynamic RAM memory.

The video data engine controls the video operations of the SDU 410. The video data engine includes a Video Raster Controller (VRC) 412 and a Video Graphics Direct Memory Access (DMA) Controller (VGDC) 413. The video data engine further includes a memory 440, such as SRAM or DRAM, which may be internal or external to the FPGA, in which command scripts and graphics data sets reside. The command scripts direct the video data engine to update the video displayed at the SDU 410. The graphics data sets render video images that implement the selection made by the passenger, for example, moving maps. In general the video data engine provides the capability to request, receive, and implement command scripts and graphic data sets into visual still images or visual information streams. Because of its flexible design and implementation the video data engine may adapt to a variety of applications that comprises the in-flight entertainment system.

The controller 411 and the memory 440 provide the means for software to manage and operate the video data engine for the given application. The software interfaces with the controllers of the video data engine through the Video Data Engine Register Set (VDERS) 415. The controllers 411, 412, 413, 414, of the video data engine access the memory 440 through the Multi-Port Memory Controller (MPMC) 416. According to one embodiment, the MPMC 416 provides direct memory access to the memory 440 for up to eight processors or controllers. As shown in FIG. 4, both the VRC 412 and the VGDC 413 connect to the MPMC 416 and are able to operate on the memory 440 independently from each other and also operate independently from the controller 411. The following descriptions below provide additional details on the features of the components mentioned above.

Video Raster Controller (VRC)

The VRC provides the video refresh function. In this embodiment, the VRC supports 32-bit and 16-bit pixels. The VRC may be configured to support one of the following resolutions:

480 columns by 272 rows
640 columns by 480 rows
800 columns by 400 rows
1024 columns by 768 rows Depending on the resolution, the VRC may achieve refresh rates exceeding 30 frames per second.

A feature of the VRC is that its video refresh buffer address is programmable by software. Using this capability, the software may switch displays between various buffers at run time. The software sets the active raster address through the Video Data Engine Register Set (VDERS).

Video Graphics DMA Controller (VGDC)

The VGDC is an intelligent DMA controller designed to support video graphics display operations. The VGDC implements the following capabilities:

Programmable source data address
Programmable source data decompression
Programmable data frame size
Programmable screen destination address
Programmable pixel size The VGDC supports run length encoded compressed graphic data. If the graphic data is compressed at the source the VGDC decompresses the graphical data as it transfers the data to the destination display buffer. The VGDC may handle variable graphic data block sizes. It may decompress and transfer a graphic data block that occupies the entire display screen. It may also decompress and transfer a smaller, rectangular graphic data block and place it in a specified position at the destination display buffer. This capability enables the software to compose a screen display consisting of various graphic icons overlaying a frame-sized background at video refresh rates.

The VGDC in concert with the appropriate commands and graphic data sets delivers the capability to support multiple, concurrent graphic video streams sharing a single frame display. The graphic video streams can operate independently of each other. The graphic video streams can also have their operation interlinked and coordinated if the application has such a requirement. The interlinked operation is accomplished through the data set definition and construction.

Miscellaneous Hardware Controllers

The video data engine is primarily designed as a high-level, high-power video graphics engine. A miscellaneous hardware controller enables a system designer to add peripheral controller for specific data acquisition functions as needed by the video data engine. Software interfaces with the miscellaneous hardware controller through the VDERS. Thus, as new application requirements arise, one or more miscellaneous hardware controllers are added to the video data engine to support one or more data input/output devices. As an example, the controller and the VGDC communicates with the miscellaneous hardware controllers through the VDERS.

Video Data Engine Register Set (VDERS)

In one embodiment, the VDERS may be implemented by means of 32-bit general purpose input/output (GPIO) ports. The VDERS provides the interface method between the video data engine and the software. The VDERS may use three GPIO ports. GPIO 0 implements the video data engine status register. GPIO 1 implements the video data engine control register. GPIO 2 implements the video data engine parameter stack. The video data engine parameter stack provides the software with the means of specifying the parameters for the various functions supported by the video data engine. The video data engine parameter stack has 16 32-bit entries having the following functions:

Raster source address—this entry defines the memory address used by the VRC as the video refresh buffer.
Screen destination address—this entry defines the destination buffer used by the VGDC for its transfer operation.
Graphic source address—this entry defines the address of where the graphic data is stored.
Line width in pixels—this entry defines the width of the graphic data block. In the case of a background graphic, the line width corresponds to the screen width.
Total graphic size in pixels—this entry is the product of the graphic block height (number of rows) and width (number of columns). In the case of a background graphic the total graphic size effectively is the screen size in pixels.
TBD—this entry is reserved for future use
TBD—this entry is reserved for future use
TBD—this entry is reserved for future use
TBD—this entry is reserved for future use
miscellaneous hardware controller register—this entry provides an interface by which the software communicates with the miscellaneous hardware controller.
TBD—this entry is reserved for future use
TBD—this entry is reserved for future use
TBD—this entry is reserved for future use
TBD—this entry is reserved for future use
TBD—this entry is reserved for future use The unused entries provide an extensible interface by which future functions can be added with minimal effect on preexisting capabilities.

Figure 5:
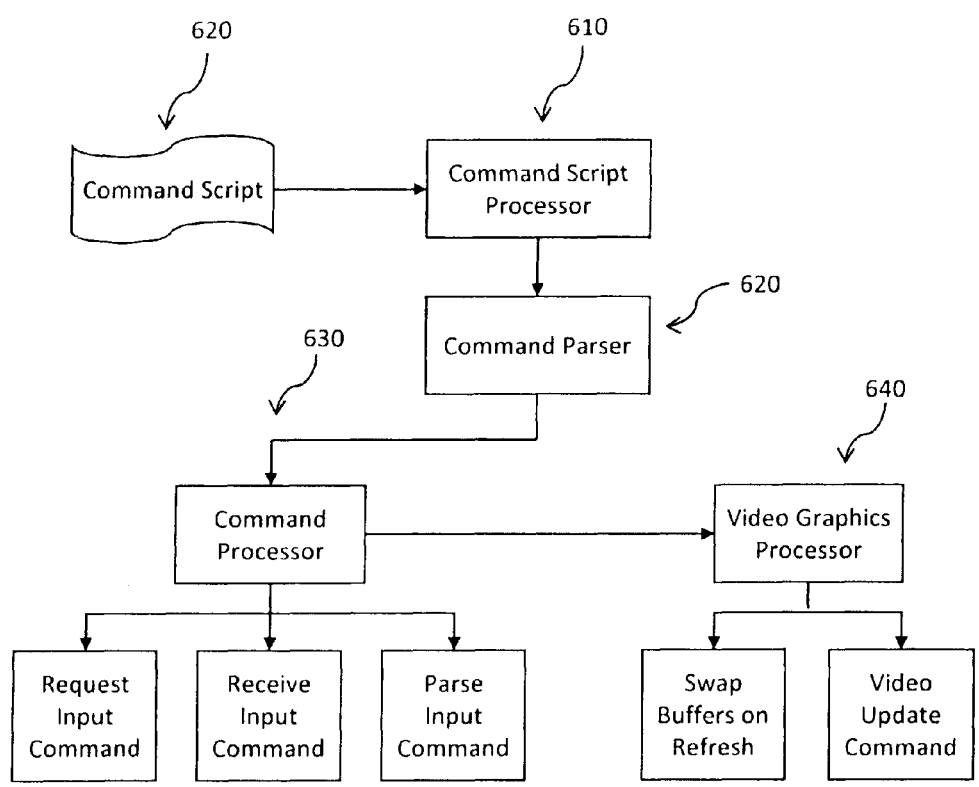
FIG. 5 illustrates a schematic diagram of a software architecture to drive a video data engine according to one embodiment.

FIG. 5 illustrates a schematic diagram of the software architecture used to drive the video data engine. The software architecture may comprise of the following sections:

Functional architecture—functional organization of the software
Data architecture—major data structures that the software uses.

Functional Architecture

The functional architecture describes the functions of the software and how it is organized to operate the video data engine. The salient feature of the functional architecture is that the behavior of the system is determined by the command script. The software provides a set of commands that are generic. The commands translate to parameter blocks that define functions that operate on data sets associated with the requested command. As shown in FIG. 5, the software operates on a command script 602, which is stored in a memory, to implement the behavior of the video data engine. The command script may be a simple ASCII text file that contains the commands needed to get the video data inputs and convert them to video display updates at the SDU. According to this embodiment, a command script processor 610 reads the command script one line at a time. The command script processor 610 copies the script entry to the parsing buffer and passes control to a command parser 620. The command parser 620 converts the ASCII command string to a parameter block that defines the required command function and the associated parameters for that function. The command parser passes the parameter block to the command processor 630. The command processor 630 dispatches commands that were parsed without error through a jump table. The function ID stored in the parameter block serves as an index into the jump table to invoke the required command function.

The sequence in which the command functions is executed is determined by the order of the command strings in the script. The script may present the command strings in the following order:

Swap Buffers on Refresh—this function swaps the active raster buffer and the DMA destination buffer (refer to VRC and VGDC for a description of the raster and DMA buffers). It then waits for the VRC to assert vertical refresh at which point the function completes.

Request Input—this function sends a message to video data engine over the FSL port, requesting data from the devices the video data engine monitors.

Receive Input—this function waits until it receives the response message containing the video update command strings. It passes the command string buffer to the input parser.

Parse Input—this function is the same command parser that dispatched the command processor. It parses each command string and passes the results to the command processor for dispatch.

Video Update—this function executes for each command string sent by video data engine. It takes the parameters specified by the command string and updates the VGDC. The VGDC updates the DMA destination buffer with the new display parameters for each instrument represented on the video screen.

The updated video parameters do not usually display until the swap buffers function executes. This mechanism ensures the video refresh buffer has a stable data set. The vertical refresh also serves to gate the update rate to the hardware display rate.

The command processor 630 executes commands that do not involve video data. In the event, the command parser 620 encounters graphic data set, the command parser 620 passes control to a video graphics processor 640. The video graphics processor 640 executes functions that are related to managing and operating the VRC and the VGDC.

Data Architecture

The data architecture describes the major data structures and variables that the software uses. The description is organized into the following sections:

Notational Conventions—this section defines conventions used in the data structure description.

Graphic Objects—this section defines the concepts and subordinate structures used to describe display entities.

Video Related Structures—this section describes the major structures that the software driving the VGDC and VRC uses to manage and operate the visual representations on the screen.

Operational Structures—this section describes the structures other than the video structures used by the software to define the behavior of the software system.

Notational Conventions

The following notations will be used in defining data types:
U8—the data type is an unsigned 8-bit integer
U16—the data type is an unsigned 16-bit integer
U32—the data type is an unsigned 32-bit integer
Structure names are presented with all capital letters
'*' after a data type indicates a pointer to that data type The FPGA may use a SRAM comprised of 1024 32K memory pages. The starting address of a page is defined as 0x8000. The combination of a 16-bit page number and a 16-bit address produce an address for the original 32 MB memory range. Bit 15 set to one signals the FPGA that the address refers to external RAM. If bit 15 is zero, the address refers to the internal SRAM or code space.

The FPGA is implemented with two registers to specify the page of a given external RAM address. The FPGA also implements two registers to specify the address within the page. The PAGEADDR structure encapsulates the 32-bit memory pointer. It has the following fields:

Page—the video data engine software treats this field as a 16-bit Big-Endian unsigned page number.

Address—the video data engine software treats this fields as a 16-bit Big-Endian unsigned offset into the page.

Graphic Objects

The visual representation of an entity defined by a NAV structure employs three graphic data types. These are the background, the foreground, and the sprite. The background graphic occupies the entire visual field of the entity that the NAV represents. Displaying the background graphic effectively erases the previous image managed by the NAV structure, replacing it with the current background graphic.

The foreground and sprite graphics define components of the visual display. These data types have the capability of being placed in a particular location of the visual field. They overlay a portion of the background. Foregrounds and sprites are presently identical in terms of how the software processes them. Distinguishing graphic types as foreground and sprite provides the future capability of implementing new attributes for one or the other data type that would affect its visual behavior.

The software refers to foreground and sprite data types as glyphs. The software manages the placing and display of these data types through the GLYPHSTRC structure. This structure has the following fields:

| Offset | Name | Type | Description |
| --- | --- | --- | --- |
| 0x00 | Glyph Pointer | PAGEADDR | This field contains the memory address of where the graphic image resides |
| 0x04 | Glyph Height | U16 | This field contains the glyph height in number of lines. |
| 0x06 | X Offset | U16 | This field contains the horizontal coordinate for the upper left corner of the glyph. |

| Offset | Name | Type | Description |
| --- | --- | --- | --- |
| 0x08 | Y Offset | U16 | This field contains the vertical coordinate for the upper left corner of the glyph. |
| 0x0A | Screen Destination | PAGEADDR | This field contains the screen destination address of where the glyph is placed on visual field. |
| 0x0E | Glyph Width | U16 | This field contains the glyph width in number of pixels. |

Note that the term "screen" above actually refers to the visual field controlled by the NAV structure. The "screen" size is the product of the height and width of the associated background. The visual field can occupy the entire physical display screen or a block within the screen.

The software checks for a page field set to 0xFFFF in both the background and glyph pointers. If the page field is 0xFFFF or if the page-address pointer is zero, the software skips processing the associated graphic. This feature serves as an error check. It also provides a means of making background links optional in the NAV structure.

NAV Structure

The NAV (short for navigation) structure enables the application to "navigate" through the various screen images for a given display entity such as a menu, moving maps, in-flight shopping menu, or some other representation of the in-flight entertainment system. The NAV structure (NAVSTRUC) defines the visual representation of a single screen image of the entity.

The following table defines the NAV structure.

| Offset | Name | Type | Description |
| --- | --- | --- | --- |
| 0x000 | NAV ID | U16 | The unique number associated with the NAV |
| 0x002 | NAV Name | 14-Byte Array | The ASCII name of the NAV |
| 0x010 | NAV Self PTR | PAGEADDR | This field is a pointer to self used to validate the structure before using it. |
| 0x014 | Unused | Unused | Reserved for future use |
| 0x01E | Background Page-Address | PAGEADDR | This fields is the pointer to the graphic image data that is the background for this NAV. |
| 0x022 | Screen Width | U16 | The screen width in pixels. This field is unused. |
| 0x024 | Next State Array | Unused | Menu navigation array |
| 0x060 | Register Array | 6-U16 Array | Reserved for future use |
| 0x06C | Unused | U16 | Reserved for future use |
| 0x070 | Foreground Count | U16 | Count of elements in the foreground Count |
| 0x072 | Sprite Count | U16 | Count of elements in the sprite array |
| 0x074 | Foreground Array | GLYPHSTRC Array | An array of structures that contain the parameters needed to place a visual object in the video buffer. |
| 0x0NN | Sprite Array | GLYPHSTRC Array | An array of structures that contain the parameters needed to place a visual object in the video buffer. |

NAV Set Descriptor

The NAV set descriptor (NAVSETDESC) defines common attributes for an array of NAV structures. An array of NAV structures constitutes a NAV set. A NAV set defines all of the screen images or visual states of a display entity. For example, one NAV set is used to display the menu of the in-flight entertainment system. Each entity that is displayed on a screen is defined by its own NAV set. Each NAV structure in the set defines one visual representation of the in-flight entertainment system.

The table below defines the NAV set descriptor.

| Offset | Name | Type | Description |
| --- | --- | --- | --- |
| 0x00 | Magic Number | U32 | This field contains a "magic" number that identifies the structure as a valid NAV set descriptor. |
| 0x04 | NAV Structure Base Address | U8 * | This field contains the base address of the associated NAV structure array |
| 0x08 | NAV Graphic Base Address | U8 * | This field contains the base address of the graphic image data linked to the NAV structures. |
| 0x0C | NAV Display Offset | U32 | This field contains the offset of where in the physical screen the NAV set is displayed. |
| 0x10 | Active NAV pointer | NAV * | This field contains the pointer to the currently displayed (or active) NAV. |
| 0x14 | Background Width | U32 | This field contains the width of the background graphic in pixels. |
| 0x18 | Background Height | U32 | This field contains the height of the background graphic in lines. |
| 0x1C | Pixel Depth | U32 | This field contains the depth of the pixel in bytes. |
| 0x20 | Full Frame Size | U32 | This field contains the size of the visual field in bytes which is the product of width. height and pixel depth. |

The software for video data engine maintains an array of NAV set descriptors. The array is set at 16 elements. This size is arbitrary and can be increased or decreased as needed. The NAV set array enables the software to maintain and manage 16 different and concurrent display entities. The software uses the magic number field to identify whether an element is initialized. When a NAV set is defined, the software sets this field. The software determines which NAV sets are activated by the magic number.

Physical Video Buffer Descriptor

The Physical Video Buffer descriptor (PHYVIDBUF) is a structure that defines the attributes for a physical video buffer (PVB). The PVB establishes an area of memory that serves as the source buffer for the Video Raster Controller or as a destination buffer for the Video Graphics DMA Controller. As described above, the VRC implements the video display refresh function. The software specifies the address of the refresh buffer. It uses the PVB to manage the location of the refresh buffer. The VGDC requires a destination buffer for its operations (see section referring to VGDC). The software also uses the PVB to manage the DMA destination buffers. The layout of the descriptor is presented in the following table.

| Offset | Name | Type | Description |
| --- | --- | --- | --- |
| 0x00 | Magic Number | U32 | This field contains a "magic" number that identifies the structure as a valid PVB descriptor. |

-continued

| Offset | Name | Type | Description |
|---|---|---|---|
| 0x04 | PVB Address | U32 | This field contains the base address of memory for the video buffer. This address corresponds to the upper left corner of the display or screen. |
| 0x08 | Width | U32 | This field contains the width of the buffer in pixels. |
| 0x0C | Height | U32 | This field contains the height of the buffer in lines. |
| 0x10 | Pixel Depth | U32 | This Field contains the depth of the pixel in bytes |
| 0x14 | Byte Width | U32 | This field contains the width of the buffer in bytes which is the product of Width and Pixel Depth. |

The software for video data engine maintains an array of PVB descriptors. The array is set at 16 elements. This size is arbitrary and can be increased or decreased as needed. The PVB descriptor array enables the software to maintain and manage 16 different display screens. The software uses the magic number field to identify whether an element is initialized. When a PHYVIDBUF is defined, the software sets this field. The software uses two variables to manage the PVB descriptors:

Active Raster Buffer—this variable contains the index into the PHYVIDBUF array of the buffer to use for the raster.
Active DMA Buffer—this variable contains the index into the PHYVIDBUF array of the buffer to user for the DMA transfers.

By having two different buffers for the raster and the DMA transfers, the software can compose one screen for the next display while the raster refreshes video from the other buffer. This mechanism avoids flickering and other artifacts caused by changing the display content during a display refresh.

An in-flight entertainment system according to one or more embodiments have been described. The exemplary in-flight entertainment system is not hardware intensive as known in-flight entertainment system, yet is a powerful in-flight entertainment system that provides for full audio-video demand, shopping, moving map, games, and more. The data driven architecture described above provides for GUI graphics, layout, and functional operations. The data driven architecture does not require the need to re-compile code in order to change user interface. For example, multiple GUIs may be stored on the server that provides for each GUI to change the look and/or feel and/or function of the in-flight entertainment system, for example, depending on the destination, flight leg, time of day, or other environment parameters. As an example, the command scripts and graphic data sets for the GUI, feel, and/or functions may be stored in a memory stick, and inserted into the server of the in-flight entertainment system, and the memory stick may be changed depending on the required GUI for the look and/or feel and/or function of the in-flight entertainment system. For example, a flight to Asia may have an Asian theme. A flight to Hawaii may have a Hawaiian theme.

Although various embodiments of the invention have been described, one of ordinary skill in the art will readily recognize that there could be variations to the embodiments and those variations would be within the spirit and scope of the present invention. Accordingly, many modifications may be made by one of ordinary skill without departing from the spirit and scope of the appended claims.

I claim:

1. An in-flight entertainment system comprising:
a server including a processor, the processor operating under an operating system; and
a server/client interface that interfaces with the server and a display unit, the server/client interface to retrieve a specified data block requested by the display unit, wherein the server/client interface sends a command to a storage device controller of the server to retrieve the specified data block from a storage device under the control of the server, and the server/client interface operating based on the server/client interface's control logic and independent of the processor operating under the operating system, wherein the display unit includes a controller that generates a packet to be sent to the client/server interface, the packet includes a header and load, the header includes a destination address and a source address, the load includes at least one or more of a sector number of the storage device, file name, target address, and size of data block, wherein the packet includes information that provides location of the specified block, wherein the server/client interface includes a controller to parse the packet to identify where the requested data block is located in the storage device, the server/client interface sends a command to a storage device controller to retrieve the specified data block,
the in-flight entertainment system further comprising a first-in-first-out (FIFO) queue, wherein the storage device controller transfers the retrieved specified data block to the FIFO queue, wherein the control logic of the server/client interface retrieves the specified data block from the FIFO queue, retrieves the target address to generate a return header for a return packet to transport the specified data block, wherein the target address of the return packet is an address or the display unit, wherein the server/client interlace comprises hardware that provides the server/client interface's control logic.

* * * * *